United States Patent [19]
Bennett

[11] 3,767,832
[45] Oct. 23, 1973

[54] AUTOMATIC ELECTRODE CONTROL

[76] Inventor: George A. Bennett, 620 18th St., Beaver Falls, Pa. 15010

[22] Filed: Aug. 17, 1972

[21] Appl. No.: 281,316

[52] U.S. Cl. .............................................. 13/13
[51] Int. Cl. ..................... H05b 7/00, F27d/11/10
[58] Field of Search.................................. 13/13

[56] References Cited
UNITED STATES PATENTS
3,277,229  10/1966  Oppenheim............................ 13/13

Primary Examiner—Roy N. Envall, Jr.
Attorney—Jacob Trachtman

[57] ABSTRACT

An electrode-positioning system for electric furnaces including a first circuit which develops a signal proportional to the magnitude of voltage at the electrode, and a second circuit which develops a signal proportional to the magnitude of current flow through the electrode. Outputs of each of the two circuits are impressed upon the power supply circuit of a reversible winch motor through saturable core reactors. The relative magnitudes of the control signals govern the direction of current flow through the motor supply circuit, and the winch motor, in turn, raises or lowers the electrode through a direct mechanical coupling.

3 Claims, 3 Drawing Figures

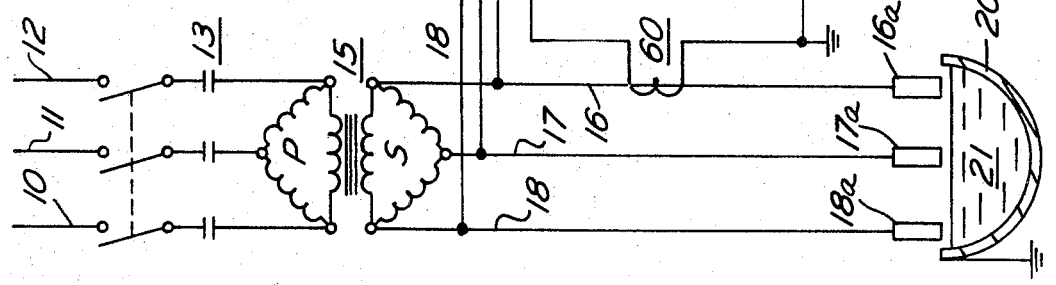
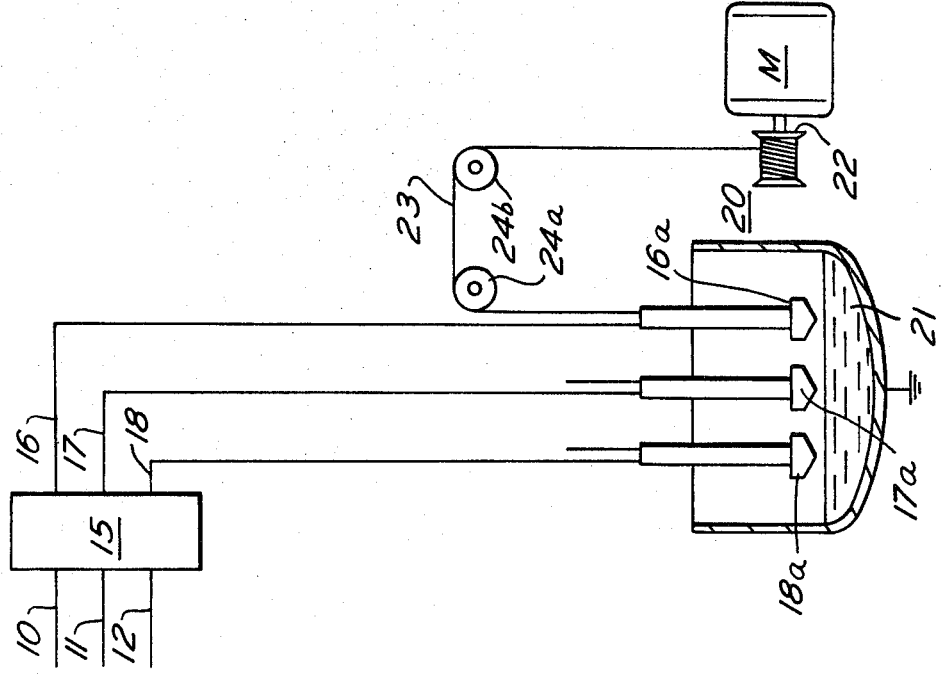
FIG.2a
FIG.1

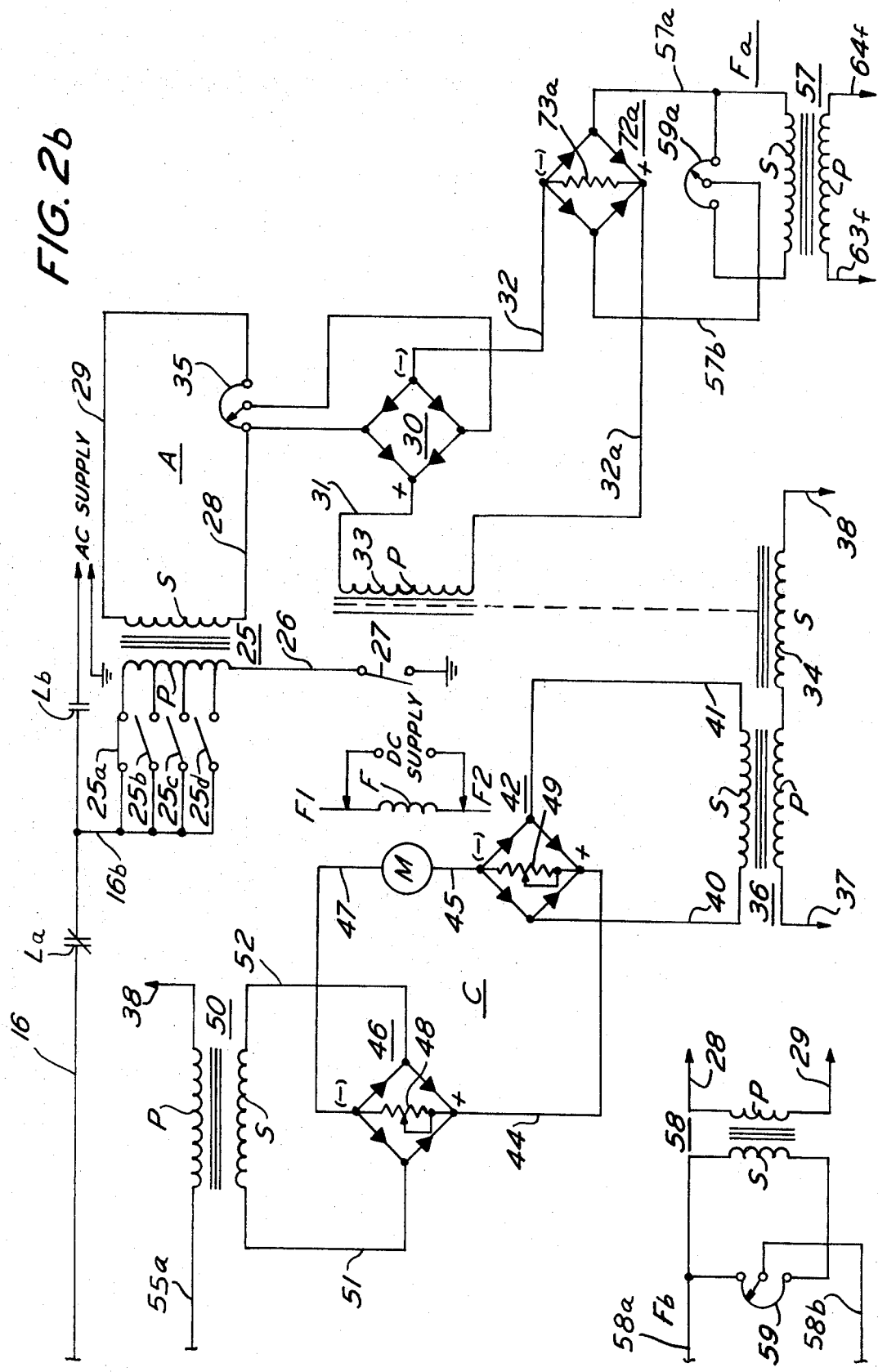

AUTOMATIC ELECTRODE CONTROL

BACKGROUND OF THE INVENTION

1. Field of the Invention

This invention relates to electrode-positioning controls for electric furnaces and the like.

2. Description of the Prior Art

It is conventional to use electric furnaces to develop high temperatures for melting, processing or holding the temperature of metals. In such furnaces, electric current is used either to form an arc between an electrode and the metal charge in the furnace to reduce the charge to a molten state, or to provide heat via a path between a submerged electrode and molten metal in the furnace having a high resistance to the current flow. The former are termed direct arc furnaces and the latter are termed submerged arc furnaces. In this connection, alternating as well as direct current may be used, but in view of its availability and for other reasons, the trend has been toward the use of conventional alternating current, three-phase electrical power.

It is highly necessary and desirable to control the positioning of the electrodes in these furnaces for several reasons. In direct arc furnaces, it is necessary to compensate for attrition of the electrode tip by moving the electrode downwardly toward the charge. Also, when melting low density charges such as scrap materials, it is essential that the electrode follow the charge as it becomes molten and gravitates downwardly to the bottom of the furnaces away from the electrode, in order to maintain a fixed, optimum arc length for efficiently melting the material. In submerged arc applications, control over the depth of penetration of the electrode into the charge is necessary in order to fix the current at which the charge is melted. In both types of furnaces, it is economically desirable to control the position of the electrodes with respect to the charge in order to prevent large lagging power factors and attendant high KVA levels resulting from high current flows, as the occurrence of this results in high electrical power costs in relation to usable power consumed.

Some systems in the past have used a motor-generated or amplidyne unit to provide power for the electrode winch motor. Electrode voltage and current sensing circuits are used to impress signals of varying polarity to the field windings of the generator, thus controlling the direction of current flow in the winch motor supply circuit which determines the direction of rotation of the winch motor. Of course, the motor-generator or amplidyne units add a significant amount to the initial cost of the control system, and further, increase the number of elements requiring maintenance.

Hydraulic systems have also been proposed. Also, other types of systems have been proposed, all of which include an intermediary electro-mechanical or mechanical element which controls or operates in conjunction with the electrode winch motor. These systems have incorporated such items as relays, motor-driven switches with rotatable wipers, differentials, and electrically controlled clutches all of which add to the initial and operating costs of these systems.

SUMMARY OF THE INVENTION

Accordingly, it is an object of this invention to develop an electrode control system that will meet the above factors and enable a wider or more extended use of proportional control as distinguished from a manual control.

Another object of this invention is to devise a control system for electrode operative positioning which will eliminate the need for rotary, moving, and other parts that tend to wear excessively under the rigors of operating conditions.

A further object of this invention is to develop a solid state voltage and current balanced system for substantially directly controlling the operative positioning of an electrode.

Still a further object of this invention is to provide an efficient, effective, but flexible control system for individual electrodes, and particularly one that enables the utilization of an alternating electrical energy source.

These and other objects of this invention will appear to those skilled in the art from the illustrated embodiment and the claims.

The invention makes use of a circuit that has opposed circuit portions that are isolated from, but derive signals from, the direct energization circuit of an associated electrode and are normally balanced when the electrode to be controlled is in a proper or desired working position, for example, in a position at which a suitable length of arc is maintained between the tip of the electrode and the metal being processed or melted or when the tip is in a properly submerged relation beneath a slag blanket of a pool of molten metal. The system uses a voltage-sensitive circuit for lowering the electrode by means of a reversible electric motor and a winch or winding drum to a position at which the top of the electrode, for example, makes contact with metal in a vessel and current starts to flow. The rush of current then actuates a current-sensitive circuit to reverse the motor and the winding drum to raise the electrode to a position at which a desired length of arc is maintained or a desired resistance to current flow is provided.

The system is set in such a manner that the voltage and current circuits balance each other as long as the electrode is, for example, in a proper arc maintaining metal melting or a proper current flow heating position.

The signals derived from the current and voltage circuits are passed through full wave rectifiers to convert the alternating current into pulsating direct current. Such direct current flow is impressed, by means of a saturable core reactor, upon power supplied by independent alternating current sources employed for energization of the motor. The motor energization current is in turn passed through full wave rectifiers to convert the augmented alternating current thus supplied into direct current.

BRIEF DESCRIPTION OF THE DRAWINGS

In the drawings,

FIG. 1 is a diagramatic vertical view in elevation showing a furnace in section provided with three electrodes and representative means for raising one of them; and FIGS. 2a and 2b comprise a schematic circuit diagram illustrating a system or means coupled to a line representing one phase of a three-phase alternating current source that is being employed for energizing an individual electrode; opposed voltage and current circuits are shown employed with the energizing circuit of the individual electrode in a coupled relation for maintaining the electrode in a proper operating position.

DESCRIPTION OF PREFERRED EMBODIMENT

In FIG. 1, a conventional three-phase electric arc furnace 20 is illustrated having three identical electrodes 16a, 17a, and 18a for melting a metal charge 21. A three-phase alternating current source represented by busbar leads 10, 11 and 12 is shown in FIG. 2a applied to the primary P of a delta-connected power transformer 15 through a circuit breaker 13. The secondary S of the transformer 15 has suitable flexible leads or cables 16, 17 and 18 representing separate phases, each connected to one of the three electrodes 16a, 17a and 18a. Since the control system for each individual electrode is the same, an exemplary or representative system embodying the invention has been applied to the circuit for the electrode 16a. The electrode 16a is shown in FIG. 1 suspended by a cable 23 which interleaves over a pair of sheaves or pulley wheels 24a and 24b and is wound and unwound on a winding drum or winch 22 that is driven by a shaft of a reversible electric motor M. The circuit system for operating the motor M is illustrated particularly in FIG. 2a and FIG. 2b.

When the switch contacts of the circuit breaker 13 are closed, three-phase power is applied to the primary winding P of the transformer 15. As a result, single-phase current is supplied from the secondary S of the transformer 15 to line 16, thus energizing electrode 16a. Assuming that the electrode is in a raised, non-operative position with respect to metal in a vessel or furnace 20, a relatively high voltage will be impressed between electrode 16a and the ground G from the secondary winding S of the power transformer 15. As illustrated, a voltage isolating transformer 15 has its primary winding P connected by lead 16b to the line 16 through switch La for inductively applying this high voltage to voltage-sensing circuit A.

The primary winding P of the transformer 25 may have as shown a series of voltage selection taps for the line 16b, as controlled by individual selector switches 25a, 25b, and 25c and 25d so as to enable the control of the voltage to be developed in circuit A. As a safety feature, a limit switch 27 is placed in lead on line 26 that is connected from an opposite side of the transformer primary P to the ground G. The switch 27 is actuated by the electrode 16a or by a suitable portion of the raising and lowering mechanism and serves to limit the maximum "in" or "down" position to which the electrode 16a may be moved by the voltage circuit A. The secondary S of the voltage transformer 25 is shown connected by leads 28 and 29 through a variable control rheostat 35, to opposite sides of a full wave rectifier 30, preferably employing semiconductor diodes. The positive terminal of the rectifier 30 is connected to the primary winding of a saturable core reactor 33 by circuit lead 31. This provides the controlled or manual setting of the lowering travel of electrode 16a.

The reactance winding P of saturable core reactor 33 is coupled through an iron core to a secondary reactance winding 34 which is connected in series with the primary P of transformer 36 having a stepdown ratio.

Single phase alternating current of, for example, 440 volts may be applied to leads 37 and 38 from an independent source of electricity to the series connected windings represented by the secondary reactor winding 34 and the primary winding P of the transformer 36. As a result, alternating current is imposed upon the Primary P of transformer 36. As a result of primary winding P being energized, a resultant alternating potential is transferred through the iron core of transformer 36, into the secondary winding S of transformer 36 on lines 40 and 41, which is then applied to the full wave rectifier bridge 42.

With full wave rectifier bridge 42 being energized, a potential is passed and rectified, resulting in a current to the motor armature over line 44 through resistor 48 of a rectifier 46 then through lead 47, and thru the motor armature back to the bridge 42. Having energy, the motor armature rotates, causing a downward movement of electrode 16a.

The electrode 16a having traveled downward, makes contact with scrap or charge, 21, and causes a current to flow through electrode 16a and line 16, which energizes current transformer 60 in circuit B which in turn has an alternating current output proportional to the current flowing in electrode 16a. The output potential of transformer 60 is identified as CT1 and CO (ground).

The output of the current transformer 60 is bridged by a fixed resistor 61 in series with a variable resistor 62 to provide a variable load. The primary winding P of an isolating transformer 56 is connected across the resistors 61 and 62 and provides a 4 to 1 step down voltage at its secondary winding S. Adjusting the loading across the primary winding P of the transformer has the effect of setting the system for the desired current which is to be passed by the electrode.

The secondary winding S of the transformer 56 is shown connected to leads 63 and 64 through a variable control rheostat 69, and opposite sides of a full wave bridge rectifier 65. Negative and positive terminals of the rectifier 65 are connected to opposite sides of a primary winding of a saturable core reactor 54 by circuit leads 66 and 67. The variable control rheostat 69, operates to control the potential applied to saturable core reactor 54.

The primary winding of the saturable core reactor 54 is coupled through an iron core to a secondary winding 55 which is connected in series over line 55a with the primary winding P of the transformer 50. An Auxiliary alternating current source is applied via leads 37 and 38 to transformer 50. The same single-phase 440 volt source used to energize transformer 36 may also be used to energize transformer 50. This series arrangement serves to vary the amplitude of the signal impressed on the primary winding P of transformer 50. As in circuit A, momentary surges passed through the current control circuit B vary the reactance of winding 55 and control the voltage delivered to the primary winding P of the transformer 50 and the resulting voltage derived by its secondary winding S.

Motor energization circuit C includes secondary winding S of the transformer 36 which is connected by leads 40 and 41 to opposite sides of a full wave rectifier 42. The output terminals of the rectifier 42, as represented by leads 44 and 45, are respectively positive and negative and are connected in conductive relation to opposite sides of the armature of reversible, direct current control motor M. Control motor M may have a permanent magnet field or a field winding F excited, for example, by 230 volts D. C. A variable resistance 49 is shunted across the output terminals of the rectifier 42 for facilitating current flow in an opposite direction in circuit C when current control circuit B has a predominating influence over the voltage circuit A.

Circuit C also includes secondary winding S of the transformer 50 which is connected by leads 51 and 52 to the input terminals of a full wave rectifier bridge 46. The output terminals of the rectifier 46, as represented by the lead 44 and 47, are respectively positive and negative and are connected in conductive relation to opposite sides of the direct current motor M. A variable resistance 48 is shunted across the output terminals of the rectifier 46 for facilitating current flow in an opposite direction in circuit C when voltage control circuit A has a predominating influence over the current control circuit B.

The adjustment of the resistors 48 and 49 also regulates the amount of dynamic braking applied in the motor armature circuit. This results from the fact that both resistors are connected in series across the armature leads 45 and 47. Thus, when the voltage collapses or the system is shut-off, continued motion of the motor M is opposed by the load of resistors 48 and 49, thereby providing the dynamic braking circuit.

As distinguished from the transformer 36 which is of a step down type, for example, converting 480/440 volts AC applied to its primary to 220 volts AC at its secondary, with a corresponding proportional increase in current at its secondary, the transformer 50 is of a 1:1 ratio in the sense that 480/440 volts AC applied to its primary winding provides 480/440 volts at its secondary winding. As a result, a potential at 440 volts, for example, is applied to the full wave rectifier 46 as compared to 220 volts as applied to the rectifier 42, which leaves a 220 volt differential. An additional input of about 220 volts is induced in motor energization circuit C from the voltage circuit A via transformer 36 when the electrode 16a is in a normal desired operating position. Thus, under normal operating conditions, the voltages derived from rectifiers 42 and 46 are balanced i.e., of equal magnitude, but of opposite polarity. The net current flow in circuit C is zero. However, when the electrode has a greater than desired spacing with respect to the metal to be melted or heated, as when the electrode is at the top of its travel or the charge melts away from the electrode, the voltage applied by circuit A will be greater than 240/220 volts, such that an energizing flow of direct current will be applied to the armature of the motor M in the direction indicated by the positive and negative sides at output terminals or rectifier 42, thereby, effecting a lowering of the electrode. On the other hand, when the current flow through the line 16 to the electrode 16 a increases above a normal value represented by a selected desired position with respect to the metal 21, this will cause the direct current supplied from circuit B and by rectifier 46 to be greater than that supplied by the rectifier 42, such that the flow of energizing current to the armature of the motor M will be in an opposite direction, as represented by the positive and negative sides applied to the output terminals of the rectifier 46.

Thus, the motor M is driven in an opposite or reverse direction to that described previously and the electrode will be raised. It will be noted that undesirable "hunting" of the electrode caused by voltage or current surges in the supply lines is minimized by the feedback systems A and B inserted in circuit lines 67a and 67b, and lines 32 and 32a.

For controlling the bandwidth of response of the control system, feedback circuits Fa and Fb are utilized to provide bandwidth biasing of the lowering signals and raising signal, respectively. Each feedback circuit includes a rectifier bridge 72, 72a connected in circuit with the primary windings 33 and 54 of voltage control circuit A and current control circuit B respectively. Thus, the inputs to rectifier 72 and 72a are proportional to the strength of the signals applied to the saturable core reactors. Full wave rectifiers 72 and 72a may be of the bridge type, and include resistances 73 and 73a shunted across the output terminals to provide for a flow of current through the rectifier which is opposite to that normally supplied. The outputs from the bias control rheostats 59 and 59a, which may be the ribbon type, are fed to the rectifiers 72 and 72a, respectively, over lines 58a and 58b, and lines 57a and 57b. The control rheostats 59 and 59a are used to control the strength of the signal coming from the secondary side of isolation transformers 57 and 58. The input terminals of feedback circuit Fa are connected by leads 63f and 64f to current control circuit B at leads 63 and 64 respectively. Input terminals of the primary of isolation transformer 58 are connected, via conductors 28f and 29f, to leads 28 and 29 respectively of voltage control circuit A. The maximum output of each of the feedback circuits Fa and Fb can be about 12 volts DC. The introduction of the feedback signal into the voltage and current control circuits causes the signal strength there to be diminished, thereby reducing the corresponding signal in the motor energization circuit C which reduces the imbalance in circuit C, which in turn causes motor M to remain stable during short cycled variations of current.

To effect manual control of the electrode position independently of the automatic control system, switches La and Lb are provided for lowering the electrode and switches Ra and Rb are provided for raising the electrode. Switch La is normally closed and switch Lb is normally open. When manual lowering of the electrode is desired, switch La is manually opened and switch Lb is manually closed. This isolates circuit A from electrode feed line 16 and causes the introduction of an independent signal from an AC supply source, to be introduced into circuit A through switch Lb. Likewise, switch Ra is normally closed and, when opened, isolates current transformer 60 and the associated circuitry from circuit B. The introduction of an independent signal source through the remainder of circuit B can then be accomplished by manually closing switch Rb.

It will be apparent from the description of the illustrated embodiment that there are no moving parts in the system of the invention from the standpoint of, for example, relays, relay contracts, generators, etc. In this connection the system is a solid state system from the standpoint of effecting an electrode position energization of the control motor M. The power supplied by the control circuits A or B augments power supplied by transformers 36 and 50, such that minimum variations will be sensitive in effecting the operation of the motor M, but need not in themselves be the full energy sources for actuating the motor M.

Although an embodiment of the invention has been illustrated in the drawings and described in this specification, it will be apparent to those skilled in the art that variations, modifications, adaptions, and additions may be made to the illustrated system or apparatus without departing from the spirit and scope of the invention.

What is claimed is:

1. A control system for adjusting the position of an electrode comprising means for sensing an electrical potential existing at the electrode and generating a signal in response thereto, means for sensing current flow through the electrode and generating a signal in response thereto; a reversible electric motor; means responsive to rotation of the motor for moving the electrode in either of two directions; a circuit for energizing the motor including a first means for causing current to flow in a first direction in the circuit and a second means for causing electrical current to flow in the circuit in a direction opposed to the first direction; means for impressing a signal generated by the potential-sensing means on the first means; means for impressing a signal generated by the current-sensing means on the second means; said potential-sensing and generating means including an isolating transformer having a primary winding and a secondary winding, a rectifying means electrically connected to the secondary winding of the isolating transformer, and a saturable core reactor having its primary winding electrically connected to the output of the rectifying means; and said current-sensing and signal generating means including a current transformer, a rectifying means, an isolation transformer electrically connecting the current transformer to the rectifying means, and a saturable core reactor having a primary winding electrically connected to output terminals of the rectifying means.

2. The electrode control system of claim 1 wherein the first means includes a first transformer and the secondary winding of the saturable core reactor of the potential-sensing and generating is in series with the primary winding of the first transformer, and wherein the second means includes a second transformer and the secondary winding of the saturable core reactor of the current sending and generating means is in series with the primary winding of the second transformer.

3. The electrode control system of claim 2 wherein the first means includes rectifying means electrically connected to the secondary winding of the first transformer and wherein the second means includes rectifying means connected to the secondary windings of the second transformer.

* * * * *